United States Patent
Kothandaraman et al.

(10) Patent No.: US 11,205,015 B2
(45) Date of Patent: Dec. 21, 2021

(54) MAGNETIC TUNNEL JUNCTION (MTJ) FOR MULTI-KEY ENCRYPTION

(71) Applicant: International Business Machines Corporation, Armonk, NY (US)

(72) Inventors: Chandrasekharan Kothandaraman, New York, NY (US); Dimitri Houssameddine, White Plains, NY (US); Bruce B. Doris, Slingerlands, NY (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 16/288,542

(22) Filed: Feb. 28, 2019

(65) Prior Publication Data
US 2020/0279058 A1  Sep. 3, 2020

(51) Int. Cl.
*G06F 21/72* (2013.01)
*G11C 11/16* (2006.01)
(Continued)

(52) U.S. Cl.
CPC ............ *G06F 21/72* (2013.01); *G06F 21/725* (2013.01); *G11C 11/161* (2013.01);
(Continued)

(58) Field of Classification Search
CPC ..................................................... G06F 21/72
See application file for complete search history.

(56) References Cited

U.S. PATENT DOCUMENTS 9,495,627 B1 * 11/2016 Annunziata ............. H01L 43/02
2004/0257849 A1 * 12/2004 Jeong ................... G11C 11/1673
365/123

(Continued)

FOREIGN PATENT DOCUMENTS

EP        2191410 B1    10/2014
WO    WO2015035033 A1    12/2015

OTHER PUBLICATIONS

Das et al., "MRAM PUF: A Novel Geometry Based Magnetic PUF With Integrated CMOS", IEEE Transactions on Nanotechnology, vol. 14, No. 3, May 2015, pp. 436-443.
(Continued)

*Primary Examiner* — Bradley W Holder
(74) *Attorney, Agent, or Firm* — Scully, Scott, Murphy & Presser, PC; Daniel P. Morris, Esq.

(57) ABSTRACT

A memory system in an integrated circuit and a method of operation. The system includes multiple magnetic tunnel junction (MTJ) structures, each MTJ structure storing a logic value according to a resistive state. A selection switch device associated with a respective MTJ structure is activated to select one of the multiple MTJ structures at a time. An output circuit is configured to sense the resistive state of a selected MTJ structure, the output circuit having a selectable input reference resistance value according to a selected first reference resistance or a second reference resistance value, and outputting a first logic value of the selected MTJ structure responsive to a resistive state of the MTJ structure and a selected first resistance reference value, or alternately outputting a second logic value of the selected MTJ structure responsive to the resistive state of the MTJ structure and a selected second resistance reference value.

6 Claims, 4 Drawing Sheets

(51) Int. Cl.
*H04L 9/08* (2006.01)
*H04L 9/30* (2006.01)
*H04L 9/14* (2006.01)

(52) U.S. Cl.
CPC ...... *G11C 11/1659* (2013.01); *G11C 11/1673* (2013.01); *G11C 11/1695* (2013.01); *H04L 9/0861* (2013.01); *H04L 9/14* (2013.01); *H04L 9/30* (2013.01)

(56) References Cited

U.S. PATENT DOCUMENTS

| | | | |
|---|---|---|---|
| 2007/0291530 A1* | 12/2007 | Katti | G11C 11/15 365/158 |
| 2010/0208513 A1* | 8/2010 | Xi | G11C 11/1673 365/158 |
| 2012/0106235 A1 | 5/2012 | Christensen et al. | |
| 2015/0071432 A1 | 3/2015 | Zhu et al. | |

OTHER PUBLICATIONS

Suh et al., "Physical Unclonable Functions for Device Authentication and Secret Key Generation", DAC 2007, Jun. 4-8, 2007, San Diego, California, USA, 8 pages.

\* cited by examiner

MAGNETIC TUNNEL JUNCTION (MTJ) FOR MULTI-KEY ENCRYPTION

FIELD

The present invention relates to a magnetic tunnel junction (MTJ) structure and, the use of plural MTJ structures in a multi-bit structure for storing different state values (e.g., bits) to form an encryption key.

BACKGROUND

Multiple key encryption, which uses a freely available public-key and unique private-key is the standard for most cryptographic communications. Currently, there are multiple ways to permanently store a 'key' as a string of stored memory bits, that includes multiple stored memory states in an integrated circuit (IC) chip. For example, IC chips are manufactured to include use of arrays of eFUSE, fuses, anti-fuses, mask ROM, and the like, can be used to store multiple keys. Each key may comprise a public key or private key for use as encryption/decryption operations of digital messages at the chip according to a public key infrastructure (PKI). The key string is typically read out as corresponding bit values. In such designs, it is quite easy to reverse engineer and determine the stored key without destroying the chip.

Solutions for storing memory states in a key include threshold voltage shifts in transistors (e.g., Random Dopant fluctuations) for storing a unique chip identifier. Other ways of storing an IC chip identifier include static random access memory (SRAM) Physical Unclonable Function (PUF) wherein the boot up of SRAM cells are random and unique to a chip. Alternatively, designs make use of dynamic RAM (DRAM) retention as an identifier. These solutions can have stability issues and take a lot of chip area (i.e., each set of key strings need different bit values).

SUMMARY

A memory system and method for providing a memory array of MTJ structures (cells or pillars) which include a string of multiple MTJ structures for storing a 'public key' and multiple 'private keys' on the same technological elements (MTJ structures), and a method for storing and accessing the public and private keys from the storage.

The memory system employing the Anti-parallel (AP) state of the MTJ pillar as having a resistance that is a function of the applied voltage and in which a resistance versus the applied voltage curve varies from bit to bit. Thus, a string of MTJ structures having structures in the AP state (and parallel (P)) state of the MTJ can be used to store memory states corresponding to a public key. The method uses each MTJ and its resistance vs. applied voltage variability to store and generate a unique private key in the same MTJ structures.

Thus, one or more MTJ structures of a key string can provide a first bit value when the string of the MTJ structures is accessed as a public key, and provide a second bit value when accessing the same string of MTJ structures as a private key.

A fabrication method to produce a pattern of MTJ structures providing a pattern of bits for use as an accessible electronic encryption/decryption key.

In accordance with one aspect of the invention, there is provided a memory system in an integrated circuit. The memory system comprises: multiple magnetic tunnel junction (MTJ) structures, each MTJ structure having a first magnetic layer a second magnetic layer and a tunnel barrier therebetween and storing a logic value according to a resistive state; a selection switch device associated with a respective MTJ, each respective switch for selecting one of the multiple MTJ structures at a time; and an output circuit for sensing the resistive state of a selected MTJ structure, the output circuit having a selectable input reference resistance value according to a selected first reference resistance value or a second reference resistance value, and outputting a first logic value of the selected MTJ structure responsive to a resistive state of the MTJ structure and a selected first resistance reference level, or alternately outputting a second logic value of the selected MTJ structure responsive to the resistive state of the MTJ structure and a selected second resistance reference level.

In accordance with a second aspect of the invention, there is provided a method of generating multiple key strings out of a common set of magnetic tunnel junctions (MTJ) formed in an integrated circuit. The method comprises: providing a string of MTJ structures having a common contact connecting a bitline conductor, each the MTJ structure of the string having a second common contact configured to connect to a first input of a readout circuit for receiving the resistive state; selecting an MTJ structure of the string of MTJ structures; applying a first bias voltage at the bitline conductor for placing the selected MTJ structure in a first resistive state responsive to the applied first bias voltage; inputting a first reference resistance value at a second input of the readout circuit; and outputting, at the readout circuit, a first bit value corresponding to the first resistive state of the selected MTJ structure, the applied first bias voltage and the input first reference resistance value, or alternately inputting a second reference resistance value at a second input of the readout circuit and outputting a second bit value corresponding to the first resistive state of the selected MTJ structure, the applied first bias voltage and the input second reference resistance value.

According to a third aspect of the present invention, there is provided a memory system. The memory system comprises: multiple MTJ structures each having a first magnetic layer a second magnetic layer and a tunnel barrier therebetween; a first conductor carrying a bias voltage to the first magnetic layer of each multiple MTJ structures; a sense amplifier for reading an output state of a MTJ structure; a second conductor associated with each MTJ structure for selecting a respective MTJ structure via a switching element, the sense amplifier comprising: a first input for sensing a resistive state of the selected MTJ structure; and a second input for receiving a selectable reference resistance value; and the sense amplifier outputting a different logic value of a selected MTJ structure dependent upon the resistive state of the selected MTJ structure and a selected reference resistance value.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Magnetoresistive random access memory (MRAM) is a non-volatile memory that combines a magnetic device with standard silicon-based microelectronics to obtain the combined attributes of non-volatility, high-speed read/write operations, high read/write endurance and data retention. Data is stored in MRAM as magnetic states or characteristics (e.g., polarity or magnetic moment) instead of electric charges. In a typical configuration, each MRAM cell includes a magnetic tunnel junction (MTJ tunnel barrier) structure (i.e., pillar or cell) for data storage. In general, the MTJ's electrical resistance will be high or low based on the relative magnetic states of certain layers within the MTJ structure. Data is programmed, i.e., written to the MTJ structure by applying certain magnetic fields or charge currents to switch the magnetic states of the layers of the MTJ structure. Data is read by detecting the resistance of the MTJ structure—its resistive state. Using a magnetic state/characteristic for storage has two main benefits. First, unlike electric charge, magnetic state does not leak away with time, so the stored data remains even when system power is turned off. Second, switching magnetic states has no known wear-out mechanism. The term "magnetoresistance" describes the effect whereby a change to certain magnetic states of the MTJ structure results in a change to the MTJ resistance, hence the name "Magnetoresistive" RAM.

In an embodiment, a multiple MTJ structures are formed in a 1-dimensional (or 2-dimensional) array using conventional known semiconductor manufacturing techniques and, in an embodiment, the plural MTJ structures of the array of structures are selectable as one-time programmable for storing the fixed resistance state.

Figure 1A:
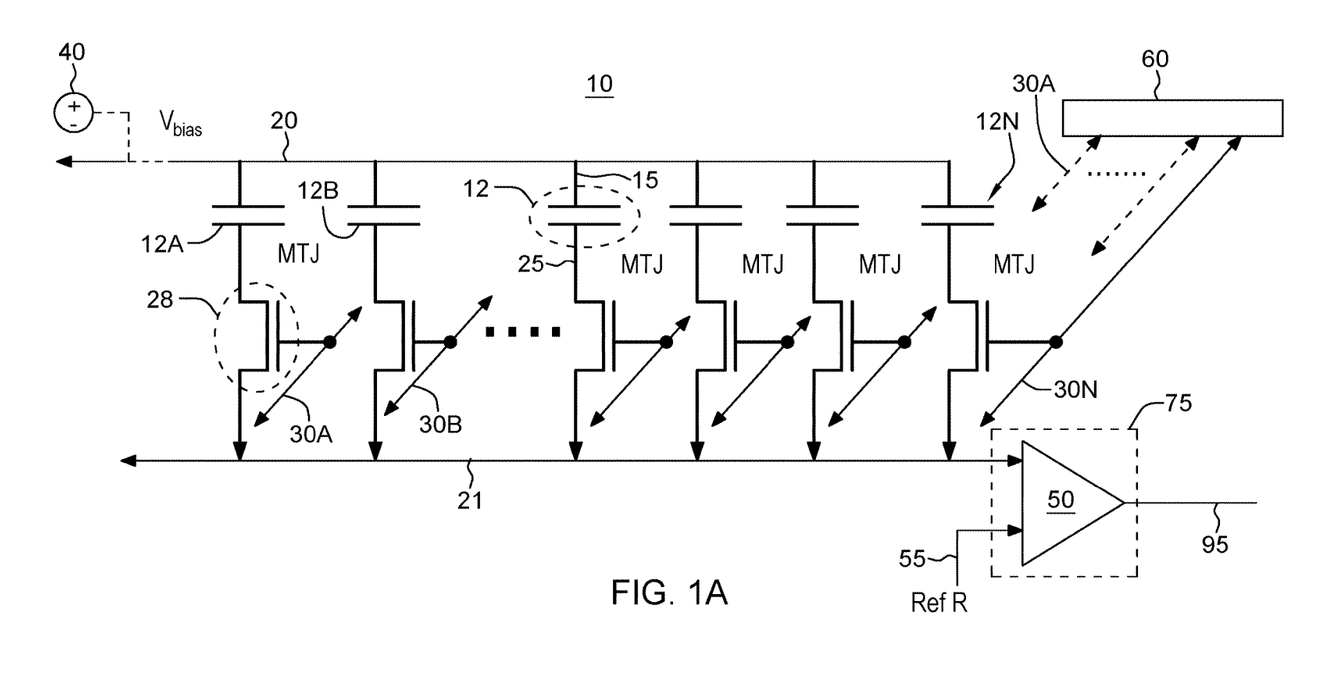
FIG. 1A depicts a memory storage circuit including a one-dimensional array of MTJ structures forming an MTJ multi-bit encryption key and a connected readout circuit having variable resistance thresholds according to an embodiment.

In an embodiment, such array of MTJ structures of an MTJ multi-bit encryption key is shown in FIG. 1A. While a linear array 10 of MTJ elements 12 is shown to form a multi-bit encryption key, it is understood that this array may easily extend to two dimensions to form a 2-dimensional array of non-volatile programmable MTJ memory structures. A linear array 10 or string of MTJ elements 12 shown in FIG. 1A can be used as a Read Only Memory and can store bits that form an encryption/decryption key to be used for secure digital communications, or that form any other pre-defined bit value sequence, e.g., an integrated-circuit chip identifier.

As shown in FIG. 1A, a linear magnetoresistive encryption key array 10 includes a string of MTJ memory storage elements or cells 12A, 12B, . . . 12N-1, 12N programmed to form an encryption key. While a linear 1-Dimensional array is shown, it is understood that these elements may be configurable as a 2-Dimensional array. A plurality of MTJ storage elements in the 1-D or 2D array of cells can be used to store one or more keys, e.g., a public encryption key(s), one or more private encryption keys, or both, in the same physical device, e.g., Integrated Circuit chip.

In a typical configuration, each MTJ memory storage elements or cells 12A, 12B, . . . 12N-1, 12N includes a magnetic tunnel junction (MTJ) structure (i.e., a pillar) for data storage, a bit line and a word line. Each MTJ's electrical resistance will be high or low based on the relative magnetic states of certain layers within the MTJ structure. Data is written to the MTJ structure by applying certain magnetic fields or charge currents to switch the magnetic states of the layers of the MTJ structure.

As shown in FIG. 1A, in one embodiment, the free layer of the MTJ element 12 connects to a top terminal conductor (e.g., wire) 15 which top terminal conductor is connected to a common voltage bit line 20. Voltage bit line 20 carries a bias voltage, $V_{bias}$, for biasing the top (e.g., free) layer of MTJ element 12. In an embodiment, as shown in FIG. 1A, a programmable bias voltage circuit 40 is programmed to provide a bias voltage at the bit line 20 so as to bias the top terminal, e.g., corresponding to the free layer, of each MTJ cell 12 connected to the bit line. In an embodiment, each bottom (e.g., pinned) layer of each respective MTJ cell 12 connects to a bottom terminal conductor (e.g., wire) 25 which connects to a terminal of a respective switch element 28, e.g., an FET transistor switch, for providing a conductive path from the MTJ element 12 to an input 21 of a sensing amplifier 50 used to read the resistive state of the MTJ cell and output at 95 a corresponding bit value.

In an embodiment, each FET transistor switch element 28 connected to a respective MTJ cell 12A, 12B, . . . 12N includes a gate terminal operatively connected to a selectable wordline such as respective wordlines 30A, 30B, . . . 30N. A voltage placed on one or more selected wordlines 30A, 30B, . . . 30N will activate that selected wordline for programming a bit value at the respective selected MTJ cell 12. In an embodiment, as shown in FIG. 1A, a programmable wordline selector circuit 60 is programmable to provide a wordline select voltage at one or more wordlines 30A, 30B, . . . 30N. In conjunction with the application of $V_{bias}$ voltage at a selected wordline, the MTJ cell 12 at that selected wordline is programmed to store a resistive state (bit) value, e.g., 0, 1. As alternately referred to herein, a bit value corresponds to a resistive state of the MTJ cell, with an MTJ cell state of an array being programmed to include: a corresponding "parallel state" (P-state) indicating low MTJ cell resistance which can be used to store a "0" bit value at the MTJ cell, a broken junction state further providing a low MTJ cell resistance state, or a corresponding "anti-parallel state" (AP-state) indicating a high MTJ cell resistance which can be used to store a "1" bit value at the MTJ cell.

In an embodiment, to achieve a broken state at an MTJ cell, during manufacture, one or more of the MTJ structures of the array can be subjected to mechanical ion-beam etching resulting in an MTJ pillar stack which may cause a re-depositing of metal products at sidewalls of the tunnel barrier layer in the MTJ pillar. Subsequent processing can eliminate the conducting metal residue re-deposited at the tunnel barrier layer sidewalls. For example, in a controlled oxygen atmosphere, the exposed re-deposited metal residue at the sidewalls is readily transformed (i.e., is oxidized) into an insulating metal oxide. By doing this current can again tunnel within the MTJ pillar stack and function properly. However, in an embodiment, by applying a high-voltage to a selected MTJ pillar, the insulating metal oxide (dielectric) residue at the sidewalls is caused to break down which can cause a short circuit and thereby intentionally leaving the MTJ pillar in the low-resistance state.

Thus, by, a pattern of selected MTJs subjected to the high-voltage to place them in a low-resistance state and non-selected normally functioning MTJs in an array creates a pattern of stored resistive states corresponding to bits for use as an accessible electronic encryption key.

In view of FIG. 1A, when activated to an ON state, an FET transistor switch 28 provides a conductive path from the respective MTJ cell 12 to the input 21 of the sensing amplifier or comparator 50. The sensing amplifier or comparator 50 is part of a readout circuit 75 for use in reading out the respective states of MTJ cells 12A, 12B, . . . , 12N and receives at a second input 55 a reference resistance value Ref R. Programming the wordlines to activate a FET 28 of a string of MTJs in a sequence, each MTJ may be individually selected such that the readout circuit 75 may successively or serially read and output the individual state of each MTJ cells 12A, 12B, . . . , 12N. In other embodiments (not shown) the MTJ cells may be configured as a 2-D array MTJ cell array and the readout circuit 75 can be structured such that each of the respective states of MTJ cells 12A, 12B, . . . , 12N can be read out simultaneously in parallel.

In an embodiment, a string of plural MTJ cells (pillars) form a bit string for use as an encryption key, and two or more types of keys may be stored in the same physical space of the same physical device (e.g., integrated circuit). For example, as shown in FIG. 1A, a string of MTJ cells 12A, 12B, . . . , 12N can be programmed as a "public" key, and the same string of MTJ cells 12A, 12B, . . . , 12N however can be programmed as a "private" key. To write bit values to a key, the MTJ cells 12A, 12B, . . . , 12N are individually programmed using known, conventional semiconductor manufacturing techniques such that the MTJ cell exhibits a specific resistive state which may be readout and logically interpreted as a bit value, e.g., when a bias voltage $V_{bias}$ is applied. For example, an MTJ programmed in an "antiparallel" (AP) state corresponding to high resistive state of a MTJ cell above a threshold resistance value may be read as a "1" bit value, while a "parallel" (P) state corresponding to a low resistive state (resistance below the threshold resistance value) may be read as a "0" bit value, and vice versa, i.e., the high resistive state of a MTJ cell (i.e., a resistance above the threshold resistance value) may be read as a "0" bit value while a low resistive state (resistance below the threshold resistance value) may be read as a "1" bit value.

Besides the applied $V_{bias}$ voltage, the actual resistance state of an MTJ cell that is read is also dependent upon the reference Ref R (resistance threshold) settings at the input 55 of the sense amplifier or comparator 50 of readout circuit 75 of FIG. 1A. The Ref R value at input 55, which is used as basis of the comparison with the read out resistance state of the selected MTJ by comparator 50, will influence whether the MTJ cell resistance state that is read by the readout circuit is above or below the reference (threshold) value, i.e., corresponds to a bit value of '1' or '0'. Thus, by reading a public key using a same bias voltage however at different a reference resistance (threshold) level at the output read circuit, can result in a bit having a different value; and vice versa, by reading a public key at different bias voltages using the same reference level at the output read circuit can result in a bit having a different value.

Figure 1B:
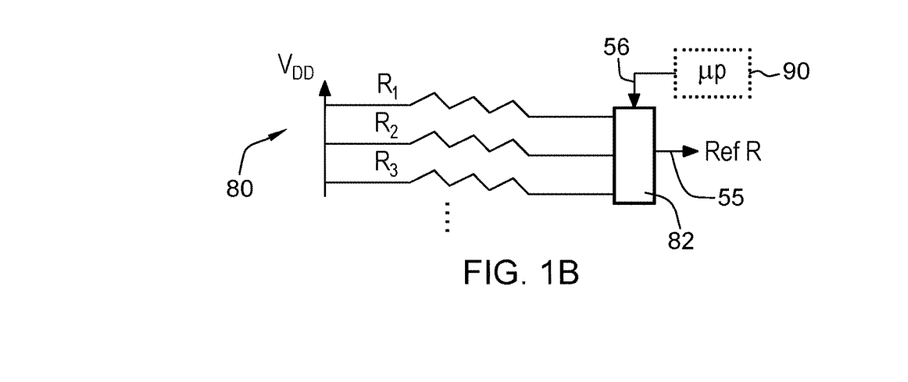
FIG. 1B depicts for use in FIG. 1A a circuit fabricated on the chip to provide a different reference resistor for comparison at the sense amplifier, a specific resistor being selected at the time of reading out a string according to one embodiment.

FIG. 1B depicts a selector circuit 80 fabricated on the chip to provide a different reference resistance value for comparison at the Ref R input at the sense amplifier shown in FIG. 1A. In particular, resistance selector circuit 80 include multiple resistor devices, e.g., R1, R2, R3, . . . , fabricated in the chip using known semiconductor manufacturing techniques, each reference resistor device having a different resistance value. At one terminal, each reference resistor R1, R2, R3 is connected to a voltage supply (e.g., $V_{DD}$) and the other resistor terminal is connected to a selector switch 82. Selector switch is operable under control of a control signal 56 issued by a control processor or like micro-controller (μp) device 90 that selects a specific resistor at the time of reading out a string at the sense amplifier 50 circuit of FIG. 1A according to one embodiment. That is, a specific resistor R1, R2, R3, . . . , is selected at the time of reading out the bit string to provide the Ref R input 55 to the comparator 50 which is used as basis of the comparison with the read out resistance state of the selected MTJ by comparator 50. This will influence whether the MTJ cell resistance state that is read by the readout circuit is above or below the reference (threshold) value, i.e., corresponds to a bit value of '1' or '0'.

Figure 2A:
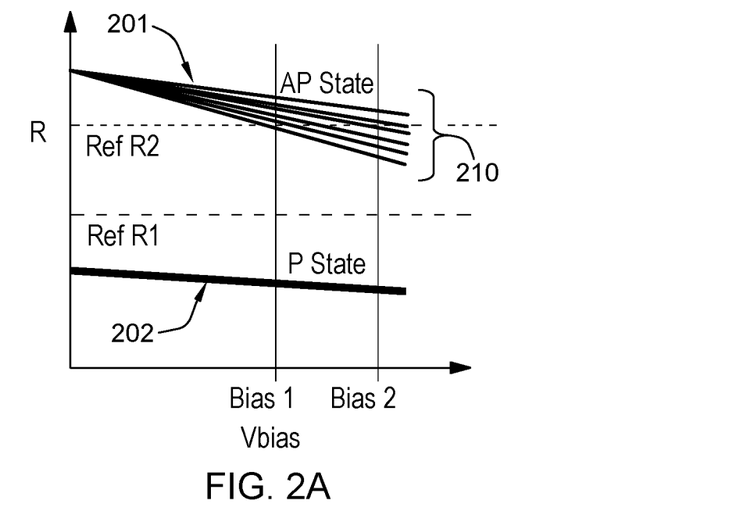
FIG. 2A shows a state diagram depicting a programmed MTJ cell in an AP-state versus the programmed MTJ cell in a P-state according to an embodiment.

FIG. 2A shows a state diagram 200 depicting a programmed MTJ cell in an AP-state 201 versus the programmed MTJ cell in a P-state 202. In an embodiment, the resistance state of an MTJ cell of the string of MTJ cells 12A, 12B, . . . , 12N is dependent upon the bias voltage $V_{bias}$ applied to the MTJ cell and the reference resistance threshold value input to the comparator of the readout circuit. As further shown in FIG. 2A are two reference levels of resistance values Ref R1, Ref R2, which are used as thresholds to differentiate resistance states of the programmed AP-state cells versus programmed P-state cells. As shown in FIG. 2A, an MTJ cell remains in the low resistive state (P state) 202 irregardless of the bias voltage $V_{bias}$ applied to the MTJ cell. As shown in FIG. 2A, the resistance value in the P-state 202 remains below a reference resistance value R1. However, in the AP state 201, the MTJ cell can exhibit multiple different resistance values 210 depending upon the bias voltage $V_{bias}$ applied to the MTJ cell. That is, in the Anti-parallel (AP) state of the MTJ pillar, the MTJ has a resistance that is a function of the applied voltage and in which a resistance versus the applied voltage curve varies from bit to bit. Thus, a string of MTJ structures having structures in the AP state can be used to store different memory states.

For example, in the anti-parallel state 201 of an MTJ cell shown in FIG. 2A, below a first Bias 1 voltage, the resistance value of the MTJ cell in the AP state 202 is largely above a reference resistance value R2. By applying a bias voltage $V_{bias}$ to the MTJ cell between Bias 1 value and Bias 2 voltage value, it is seen that the resistance state of the cell in the AP state 202 is variable from above reference (threshold) resistance value Ref R2 to below the reference resistance value R2 which can correspond to the MTJ cell having a readout bit value '1'. By increasing the bias voltage $V_{bias}$ applied to the MTJ cell to above Bias 2 voltage, it is seen that the resistance state of the cell in the AP state 202 is largely below the resistance threshold value Ref R2 which can correspond to the MTJ cell having a readout bit value '0'.

Thus, as an MTJ cell resistive state is dependent upon the voltage bias $V_{bias}$ applied to the MTJ cell, there may be read out at the sense amplifier output circuit, a different bit value depending upon a comparison with a reference (Ref) resistance. For example, in view of FIG. 2A, an MTJ cell with a programmed resistance state in an AP state 202 can be read-out as a first "bit" value, e.g., bit value=1, when a bias voltage less than a voltage $V_{bias}$=Bias 1 is applied to the MTJ cell and that corresponding resistance value is compared at the sense amplifier to a Ref 2 resistance threshold value. However, the same MTJ cell having the programmed resistance state in an AP state 202 can be read-out as a second opposite "bit" value, e.g., bit value=0, when a bias voltage equal to or greater than a voltage $V_{bias}$=Bias 2 is applied to the MTJ cell and when that corresponding resistance value is compared at the sense amplifier to the Ref R2 resistance threshold value.

Figure 2B:
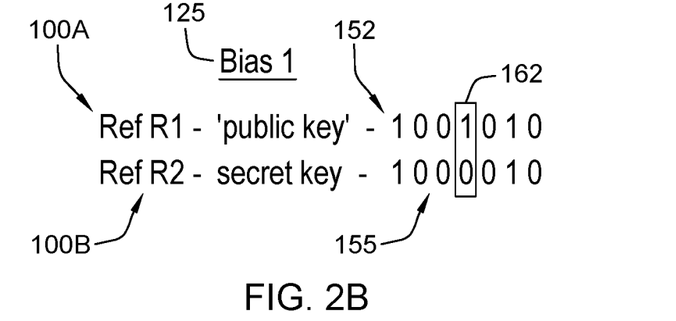
FIG. 2B illustrates bit values provided by an example string of seven MTJ cells having programmed P states corresponding to "0" bit values when read out by sense amplifier circuit, and AP states corresponding to "1" bit values when read out by sense amplifier circuit based on a first combination of a first applied bias voltage and different reference resistance values according to an embodiment.

FIG. 2B illustrates bit values of an example string of seven MTJ cells having programmed P states corresponding to "0" bit values when read out by sense amplifier circuit, and AP states corresponding to "1" bit values when read out by sense amplifier circuit based on a first combination of a first applied bias voltage and different reference resistance values.

For example, in the embodiment shown in FIG. 2B, a string of seven MTJ cells is programmed as a bit string 152 and may be sequentially read out of a sense amplifier circuit as having resistive states corresponding to bit values including '1 0 0 1 0 1 0'. These MTJ state values are output only when there is a corresponding application of a voltage $V_{bias}$=Bias 1 voltage 125 at each of the MTJ cells of the string and when the MTJ state values are being read out by sense amplifier relative to a Ref R1 threshold resistance value 100A at the sense amplifier output circuit. In this embodiment, this string of seven MTJ cells 152 is used as a "public" key for subsequent use in encoding communications transmitted from or decoding encrypted communications received at the chip.

However, in the embodiments herein, by altering the Reference resistance threshold input at the read out (sense amplifier) circuit, the same string of seven MTJ cells can be programmed as a bit string 155 and may be sequentially read out of a sense amplifier circuit as having values including '1 0 0 0 0 1 0'. These MTJ state values are output only when there is a corresponding application of a voltage $V_{bias}$=Bias 1 voltage 125 at each of the MTJ cells of the string and when the MTJ state values are being read out by sense amplifier relative to a Ref 2 threshold resistance value 100B at the sense amplifier output circuit. In an embodiment, this same string of seven MTJ cells 155 is stored for use as a "private" key for encoding communications transmitted from or decoding encrypted communications received at the chip. For example, a controller at the IC can use the 'private' key in conjunction with a hash function to encrypt all subsequent communications and/or authenticate communications. In addition, a received communication can be decrypted only with the private key.

This is due to the fact that, as shown in FIG. 2A, the AP state may correspond to a resistance value below the Ref R2 resistance threshold value (and thus read as a bit value '0') or correspond to a resistance value above the Ref R2 resistance threshold value (and thus read as a bit value '1'). Thus, the MTJ cell of the public key corresponding to a bit output value 162 is read out as a "1" value when voltage $V_{bias}$=Bias 1 voltage 125 is applied to the MTJ cell of the string and is compared against the first resistance threshold value Ref R1 100A as the read-out sense amplifier. However, as shown, the same MTJ cell of the public key corresponding to a bit output value 162 is read out as a "0" value when voltage $V_{bias}$=Bias 1 voltage is applied to that MTJ cell of the string and is compared against the second resistance threshold value Ref R2 100B.

Figure 2C:
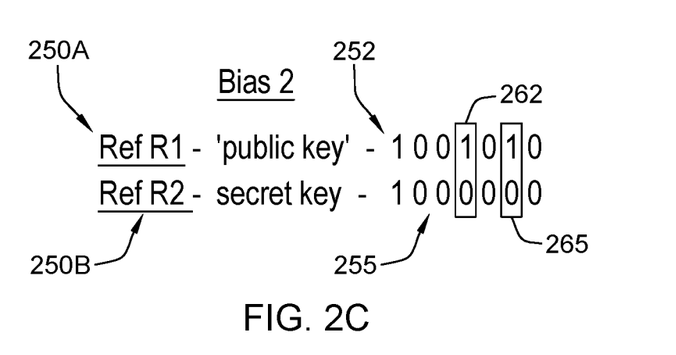
FIG. 2C further illustrates bit values provided by the same example string of seven MTJ cells having programmed P states and AP states when read out by sense amplifier circuit based on a second combination of a second applied bias voltage and different reference resistance values according to an embodiment.

FIG. 2C further illustrates bit values of a string of seven MTJ cells having programmed P states corresponding to "0" bit values when read out by sense amplifier circuit, and AP states corresponding to "1" bit values when read out by sense amplifier circuit based on a second combination of a second applied bias voltage and different reference resistance values.

For example, in the embodiment shown in FIG. 2C, a string of seven MTJ cells is programmed as a bit string 252 and may be sequentially read out of a sense amplifier circuit as having values including '1 0 0 1 0 1 0'. These MTJ state values are output only when there is a corresponding application of a voltage $V_{bias}$=Bias 2 voltage at each of the MTJ cells of the string and when the MTJ state values are being read out by sense amplifier receiving a Ref 1 threshold resistance value 250A at the sense amplifier output circuit. In an embodiment, this string of seven MTJ cells 252 is used as a "public" key for encoding communications transmitted from or decoding encrypted communications received at the chip.

However, in the embodiments herein, by altering the reference resistence threshold at the read out (sense amplifier) circuit, the same string of seven MTJ cells can be programmed as a bit string 255 and may be sequentially read out of a sense amplifier circuit as having the corresponding values '1 0 0 0 0 0 0'. These MTJ state values are output only when there is a corresponding application of a voltage $V_{bias}$=Bias 2 voltage at each of the MTJ cells of the string and when the MTJ state values are being read out by sense amplifier relative to a Ref 2 threshold resistance value 250B at the sense amplifier output circuit. In an embodiment, this same string of seven MTJ cells 255 is used as a "private" key for encoding communications transmitted from or decoding encrypted communications received at the chip. This is due to the fact that, as shown in FIG. 2A, the AP state may correspond to a resistance value below the Ref R2 resistance threshold value or above the Ref R2 resistance threshold value. Thus, the MTJ cells of the public key corresponding to a bit output values 262, 265 is read out as a "1" value when voltage $V_{bias}$=Bias 2 voltage is applied to the MTJ cell of the string and is compared against the first resistance threshold value Ref R1. However, as shown, the MTJ two cells of the public key corresponding to a bit output value 262, 265 have "flipped" and are read out as a "0" value when voltage $V_{bias}$=Bias 2 voltage is applied to that MTJ cell of the string and is compared against the second resistance threshold value Ref R2 applied at the sense amplifier.

Figure 3A:
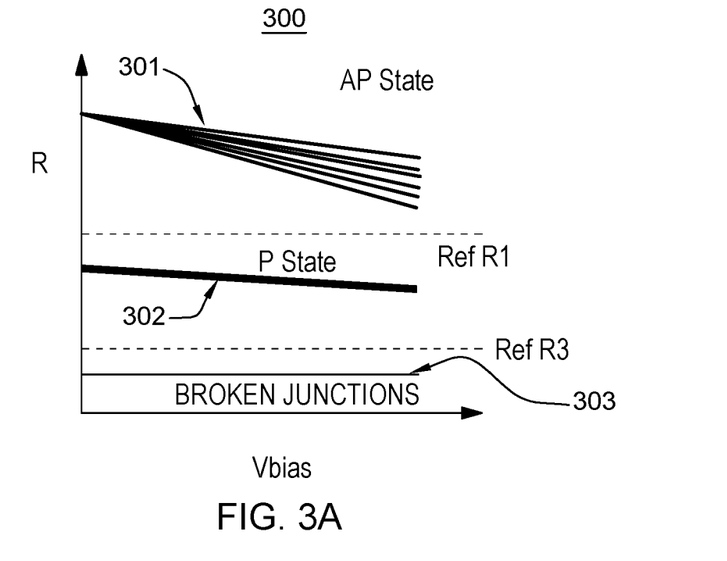
FIG. 3A shows a further state diagram depicting a programmed MTJ cell in an AP state, the programmed MTJ cell in a P state, and showing an embodiment of an MTJ cell having a broken junction according to an embodiment.

FIG. 3A shows a further state diagram 300 depicting a programmed MTJ cell in an AP state 301, the programmed MTJ cell in a P state 302, and showing an embodiment where the MTJ junction is broken, i.e. a broken junction state 303. That is, by engineering MTJs to have of an array of MTJs to have an insulating sidewall structures across the MTJ's tunnel barrier junction, and then by subjecting selected MTJs to the high-voltage causing the breakdown of the insulating sidewalls, or the tunnel barrier, those selected MTJ's will be shorted and can be placed in a permanent low-resistance state. In the broken junction state, the MTJ cell is at a low resistance state which is lower than the P-State of the MTJ cell. This low resistance state of an MTJ cell having a broken junction remains at its low resistance state regardless of any bias voltage applied to the cell. As further shown in FIG. 3A are two reference levels of resistance values: Ref R1 that corresponds to the value of Ref R1 in embodiments of FIG. 2A, and Ref R3 which are used as thresholds to differentiate resistance states of the programmed P-state low resistance cells and cells having the broken junction low resistance cell state. In an embodiment, the resistance value of Ref R3 is lower than the resistance values of both Ref R1 and Ref R2. Thus, in a further embodiment shown in FIG. 3A, an MTJ cell of a string of MTJ cells can store a '0' bit value in a programmed P-state 302 which corresponds to a soft '0' as long as it has a value below a Ref R1 resistance threshold at the output circuit comparator. Alternatively, an MTJ cell of a string of MTJ cells can store a '0' bit value in a broken junction state which corresponds to a hard '0' state irregardless of any applied bias voltage or reference voltage. A soft '0' or hard '0' can be distinguished by changing the resistance threshold input at the readout circuit comparator from the Ref R1 value to the reference resistance value Ref R3.

Figure 3B:
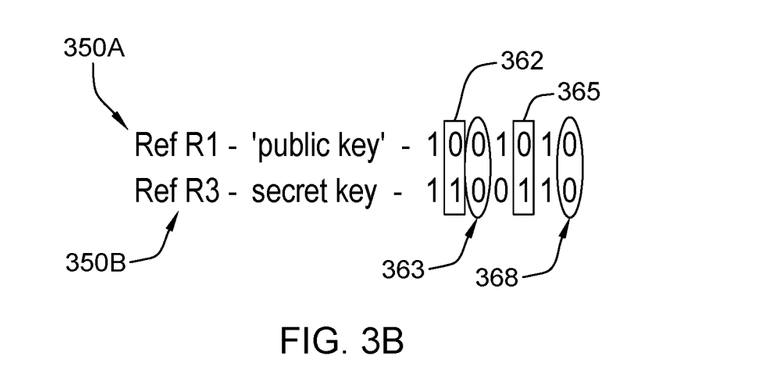
FIG. 3B illustrates bit values read out of a string of MTJs used to store both a public key and private key and which provide MTJ state values output regardless of any application of a bias voltage to the MTJ cells of the string and only when the MTJ state values are being read out by sense amplifier receiving different reference resistance values according to an embodiment.

Thus, in a variation, as shown in FIG. 3B, a string of MTJs can be used to store a "public" key having a value of '1 0 0 1 0 1 0'. These MTJ state values are output regardless of any application of a bias voltage to the MTJ cells of the string and only when the MTJ state values are being read out by sense amplifier receiving a Ref R1 threshold resistance value 350A at the sense amplifier output circuit. In this example, the MTJ cell bits 362 and 365 do not have broken junctions and thus correspond to soft '0' bits when their resistance values are compared against the Ref R1 threshold resistance value 350A at the sense amplifier output circuit. That is, as shown in FIG. 3A, the P-state resistance of the MTJ cell is slightly less than the Ref R1 resistance state at the readout circuit comparator thus corresponding to bit value soft '0'. However, in a subsequent application, when the reference resistance value applied to the input of the readout circuit comparator is Ref R3, the cells 362, 365 corresponding to the soft '0' bit values are flipped to bit '1' values. This is because when the MTJ cells are programmed in the P-state 302 as shown in FIG. 3A, when the reference level decreases to Ref R3, the P-state resistance value becomes greater than the value of Ref R3, thus, their corresponding values are read out as a bit '1'. The remaining bits 363, 368 corresponding to MTJ cells with broken junctions that have the hard '0' state remain as an output bit level '0' as their resistance value always remains below Ref R3. In the embodiment depicted in FIGS. 3A, 3B, the string of multiple MTJ cells can be programmed and used as a "private" key as long as the readout circuit reference resistance value is changed to Ref R3 which causes the flipping of the soft '0' bits of the MTJ cells in the P-state.

In an embodiment, a "public" key can correspond to or comprise a chip identifier, e.g., a "Name", as an output of the public key. This key is visible, i.e., can be viewed as a string of programmed MTJ cells, e.g., MTJ cells that are permanently written. The same MTJ cells of the "public" key can also store a "private" key and when read out by a configured sense amplifier can corresponds to a different identification (e.g., "mother's maiden name"). In an embodiment, the private key is only known to one chip and can be used to encrypt subsequent digital communications at the chip.

Figure 4:
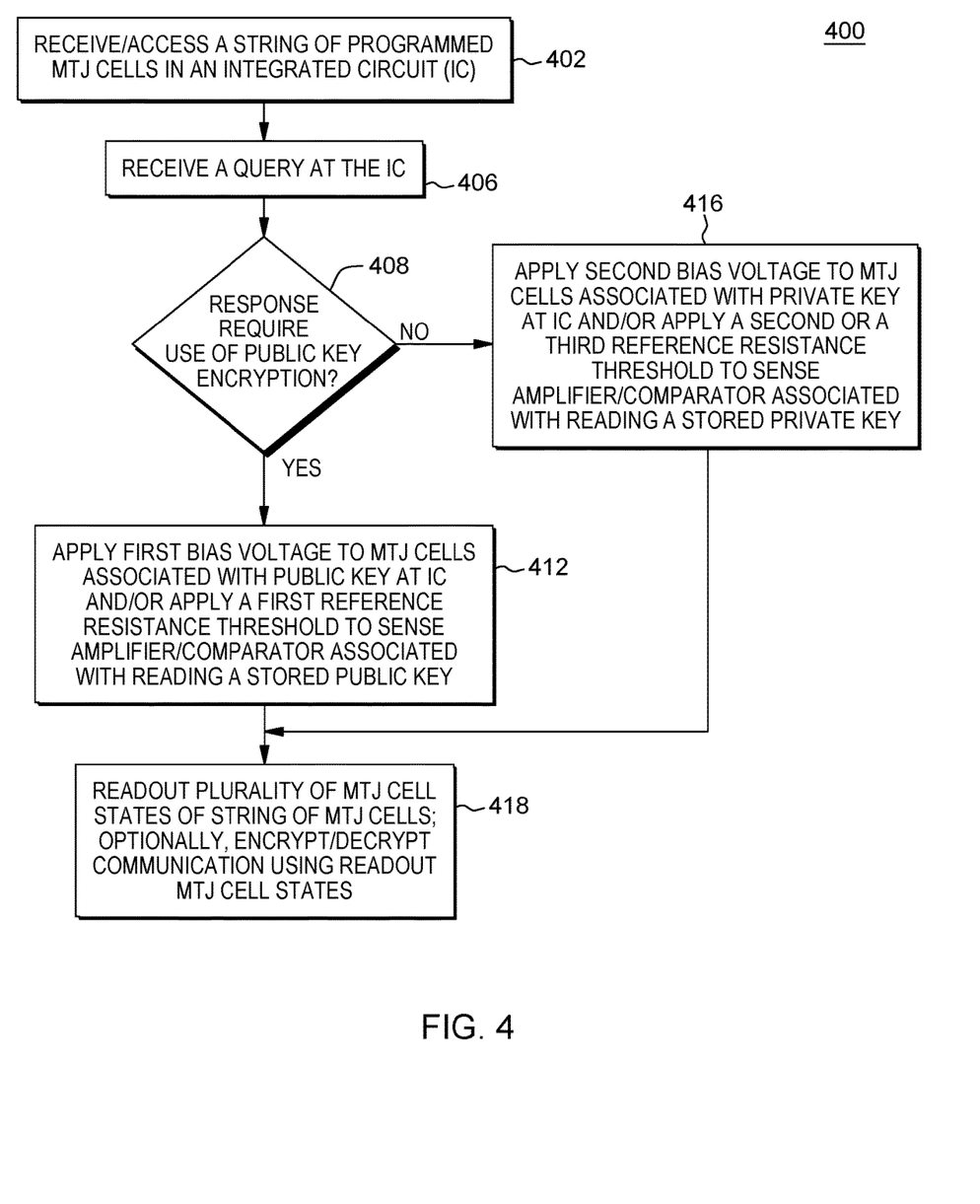
FIG. 4 depicts a method of accessing a stored public key and/or private key provided in a string of MTJ structures programmed to store a public key and multiple private keys in the same MTJ structures.

FIG. 4 depicts a method 400 of accessing a stored public key and/or private key provided in a string of MTJ structures programmed to store a public key and multiple private keys in the same MTJ structures. In operation, at 402 an integrated circuit chip is accessed that includes a string of programmed MTJ structures forming a public and multiple private keys. At 406, the IC may be interrogated and receive interrogation queries. For example, the chip may be requested to provide an identification, e.g., chip identifier, or even provide a proprietary identification code or name ("mother's maiden name"). In response to receiving an interrogation or query at the chip, at 408, a determination is made as to the type of query received, i.e., whether the query is requesting a name or chip identifier requiring use of the stored public key, e.g., for encrypting a digital message, or alternatively requesting a proprietary name or code. In response, if it is determined that the query is requesting a name or chip identifier requiring use of the stored public key, then at 412, a chip controller can control access to the string of MTJs corresponding to the public key, cause the bias voltage circuit to apply a first $V_{bias}$ bias voltage (e.g., Bias 1) to the bitline conductor connecting the string of MTJs and apply a pre-determined reference resistance threshold, e.g., Ref R1 value such as shown in FIG. 2B, at the input of readout circuit 75 of FIG. 1A. At 418, the output circuit 75 can then sequentially read out the string of MTJs corresponding to a public key (e.g., chip name), and optionally encrypt/decrypt a digital communication using the bit values generated using the string of MTJ cell states.

Alternatively, in response, if it is determined that the query is requesting a name or chip identifier requiring use of the stored public key, then at 412, a chip controller can access the string of MTJs corresponding to the public key, cause the bias voltage circuit to apply a different $V_{bias}$ bias voltage (e.g., Bias 2) to the bitline conductor connecting the string of MTJs, and apply the pre-determined reference resistance threshold, e.g., Ref R1 value such as shown in FIG. 2C, at the input of readout circuit 75 of FIG. 1A. At 418, the output circuit 75 can then sequentially read out the string of MTJs corresponding to a public key (e.g., chip name).

Returning to step 408, if it is determined that the query is requesting a proprietary or secret data requiring use of the stored private key, then the process proceeds to 416, where, in a further operation, the chip controller can access the same string of MTJs corresponding to the public key, instruct the bias voltage circuit to apply the same first $V_{bias}$ bias voltage (Bias 1) to the bitline conductor connecting string of MTJs, however, apply another pre-determined reference resistance threshold, e.g., Ref R2 value such as shown in FIG. 2B, at the input of readout circuit 75 of FIG. 1A. The output circuit can then sequentially read out the string of MTJs corresponding to a private key (e.g., mother's maiden name).

Alternatively, in response, if it is determined that the query is requesting a proprietary or secret data requiring use of the stored private key, then at 416, the chip controller can access the string of MTJs corresponding to the public key, cause the bias voltage circuit to apply a different $V_{bias}$ bias voltage (e.g., Bias 2) to the bitline conductor connecting the string of MTJs, and apply a pre-determined reference resistance threshold, e.g., Ref R2 value such as shown in FIG. 2C, at the input of readout circuit 75 of FIG. 1A. At 418, the output circuit 75 can then sequentially read out the string of MTJs corresponding to a private key and use the read out bit string in conjunction with HASH function to encrypt a digital communication.

It is understood that, irregardless of the applied $V_{bias}$ bias voltage, the chip controller can apply another pre-determined reference resistance threshold, e.g., Ref R3 value such as shown in FIG. 3B, at the input of readout circuit 75 of FIG. 1A which will generate a further private key of the multiple stored private keys.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A memory system in an integrated circuit, the memory system comprising:
   multiple magnetic tunnel junction (MTJ) structures, each MTJ structure having a first magnetic layer, a second magnetic layer, and a tunnel barrier therebetween and storing a logic value according to a resistive state;
   a selection switch device associated with a respective MTJ structure, each respective selection switch for selecting one of said multiple MTJ structures at a readout time;
   a bias circuit for applying a selectable bias voltage to a selected MTJ structure, said selected MTJ structure having a first resistive state dependent upon a first applied voltage bias level and said bias circuit alternatively applying a second bias voltage to the selected MTJ structure, said MTJ resistive state is a second resistive state dependent upon said applied second bias voltage;
   an output circuit for sensing said resistive state of the selected MTJ structure, said output circuit having a selectable input reference resistance value according to a selected first reference resistance value or a second reference resistance value,
   a resistance selector circuit coupled to said output circuit, said resistance selector circuit including multiple resistor devices, said resistance selector circuit programmable to select a first resistor device of said multiple resistor devices to provide a corresponding first reference resistance value at said readout time or to select a second resistor device of said multiple resistor devices to provide a corresponding second reference resistance value to said output circuit at said readout time, and said output circuit responsively outputting a first logic value of said selected MTJ structure responsive to a second resistive state of said MTJ structure and a provided first reference resistance value at a first readout time and outputting a second logic value of said selected MTJ structure responsive to the second resistive state of said MTJ structure and a provided second reference resistance value at a second readout time.

2. The memory system as claimed in claim 1, wherein said multiple MTJ structures store a public key or a private key, a first logic value determined for a single MTJ structure corresponding to a bit of a stored public key, and a second logic value determined for the single MTJ structure corresponding to a bit of a stored private key.

3. The memory system as claimed in claim 2, wherein one or more MTJ structures includes a broken MTJ structure having a shorted junction, said broken MTJ structure having a third resistive state.

4. The memory system as claimed in claim 3, said output circuit having a selectable third reference resistance value corresponding to a resistance value lower than each said selectable first and second reference resistance values.

5. The memory system as claimed in claim 4, wherein said multiple MTJ structures store multiple private keys, a bit value of each MTJ structure of each private key dependent upon a different combination of said first or second applied bias voltage and one of: said first reference resistance value, said second reference resistance value or said third reference resistance value input at said output circuit.

6. The memory system as claimed in claim 4, wherein said multiple MTJ structures store multiple private keys, a bit value of each MTJ structure of each private key dependent upon a different combination of said first or second applied bias voltage and one of: said first reference resistance value, said second reference resistance value or said third reference resistance value input at said output circuit.

* * * * *